United States Patent [19]
Halvorson

[11] Patent Number: 6,127,747
[45] Date of Patent: Oct. 3, 2000

[54] METHOD AND APPARATUS FOR DETECTING LEAKAGE CURRENT ON A TWO WIRE DC OR AC POWER LINE

[75] Inventor: David H. Halvorson, Cedar Rapids, Iowa

[73] Assignee: Westinghouse Air Brake Technologies Corporation, Wilmerding, Pa.

[21] Appl. No.: 09/397,112

[22] Filed: Sep. 16, 1999

[51] Int. Cl.[7] .................................................. H01H 35/00
[52] U.S. Cl. ........................ 307/131; 303/3; 303/122.04
[58] Field of Search .................................. 307/18, 25, 28, 307/75, 87, 131, 130, 140; 324/509, 503, 504, 510, 512, 522, 523, 527; 303/3, 7, 15, 20, 122.04, 122.05; 361/42

[56] References Cited

U.S. PATENT DOCUMENTS

| | | | |
|---|---|---|---|
| 3,996,513 | 12/1976 | Butler | 324/62 |
| 5,818,181 | 10/1998 | Ballard | 315/276 |
| 5,986,860 | 11/1999 | Scott | 361/42 |

*Primary Examiner*—Josie Ballato
*Assistant Examiner*—Robert L DeBeradinis
*Attorney, Agent, or Firm*—McGuire Woods, LLP

[57] ABSTRACT

A method and apparatus detects leakage current on a two wire power line and, in particular, provides a way to prevent hazardous electrical shocks to personnel on ECP equipped railroad trains. Two resistors of equal value are respectively connected in series to the two wires of the power line. A sensing resistor is connected in series with a junction of first two resistors, and a low voltage power source is connected between the sensing resistor and earth ground. A sensor is connected across the sensing resistor to detect a leakage current. The sensor is capable of detecting either positive or negative leakage currents. An output of the sensor is supplied to a controller which controls a high voltage power source connected across the two wires of the power line to be either in an OFF state or enabled to be in an ON state, depending on whether a leakage current is sensed by the sensor.

15 Claims, 3 Drawing Sheets

METHOD AND APPARATUS FOR DETECTING LEAKAGE CURRENT ON A TWO WIRE DC OR AC POWER LINE

BACKGROUND OF THE INVENTION

1. Field of the Invention

The present invention generally relates to electrical shock prevention and, more particularly, to a method and apparatus for detecting leakage current on a two wire power line.

2. Background Description

In the past, the railroads have typically operated trains having only a single air line extending the length of the train. This air line was used for both providing a source of compressed air and a medium for propagating braking signals. While this system has been used extensively in the past, it has several drawbacks. Signaling via air pressure messages propagating through the air line has a limited propagation speed. For example, for a 150-car freight train, it may take fifteen seconds or more for a braking message to reach the 150th car, thereby delaying the full application of the rail car brakes and consequently extending the distance required to stop the train. In recent years, the Association of American Railroads (AAR) and individual railroads have investigated using electronically controlled pneumatic (ECP) brake systems. These systems typically use electronic messages on a power line extending the length of the train to activate the brakes on each car because the electronic signal propagation velocity is theoretically limited only by the speed of light or about 983,571,056 feet per second in a free space environment. However, in a cable, the speed of electronic signal propagation may slow to 60 percent of the speed of light in a vacuum, which still would be about 590,000,000 feet per second. For a typical freight train consisting of 150 cars each approximately 60 feet long, a train length could be approximately 9,000 feet. An electronic signal in a cable will travel the length of the train in only about 15 micro seconds while a pneumatic signal is limited to the speed of sound in air or about 1,130 feet per second. However, in a pipe with numerous couplings, turns, and other restrictions, the pneumatic signal propagation may slow to between 600 and 900 feet per second. At 600 feet per second, this pneumatic signal will require about 100 milliseconds to propagate through each car or about fifteen seconds to propagate the length of the train. The ECP brake system allows for nearly instantaneous activation of the railcar brakes along the entire length of the train. These ECP systems have been tested in the field and now are being considered for definition in an AAR specification. Persons skilled in the art are aware of the existing AAR efforts and the numerous tests of ECP and ECP-like field tests which have occurred.

Cable based ECP brake systems for railroads utilize a two wire cable that carries both digital communication signals and system power. The system power used is presently 230 Volts DC, but other AC or DC voltages could be used. The two-wire power system is floating relative to earth ground and the American Association of Railroads (AAR) approved connectors for the system do not support the addition of a third wire for a safety ground. The metal body of railroad cars, the tracks, the inter-car couplers form a somewhat intermittent connection to earth ground and to each other. Given that the body of any railcar may be isolated from earth and other railcars at any given time, it is possible that a short circuit between one of the conductors of the train line and the car body could result in a dangerous voltage being present on the body of the car. Conventional Ground Fault Interruption (GFI) devices do not work well in this application because they are triggered by the digital communication signals present on the same wires.

SUMMARY OF THE INVENTION

It is therefore an object of the present invention to provide a method and apparatus for detecting leakage current on a two wire power line.

It is another object of the invention to provide a way to prevent hazardous electrical shocks to personnel on ECP equipped railroad trains.

According to the invention, there are provided two resistors of equal value respectively connected in series to the two wires of the power line. A sensing resistor is connected in series with a junction of first two resistors, and a low voltage power source is connected between the sensing resistor and earth ground. A sensor is connected across the sensing resistor to detect a leakage current. The sensor is capable of detecting either positive or negative leakage currents. An output of the sensor is supplied to a controller which controls a high voltage power source connected across the two wires of the power line to be either in an OFF state or enabled to be in an ON state, depending on whether a leakage current is sensed by the sensor. The controller may also set the high voltage source to ON or OFF based on other ECP system inputs, including the train engineer's command.

The invention is particularly applicable to ECP equipped trains in which digital signals are transmitted on the two wire power line. In this application, the controller may be incorporated in the HEU of the lead locomotive. Additionally, a capacitor is connected between the junction of the first two resistors and earth ground, forming a low pass filter to minimize the effects of the digital signals. In operation, the controller initially sets the high voltage power source to the OFF condition and then checks the sensor to determine if a leakage current is detected. If so, the high voltage power source is maintained in the OFF state and the engineer is warned of the fault condition. If no leakage current is detected, the controller enables the high voltage power supply to be set to the ON state, if commanded. While the high voltage power supply is in the ON state, the sensor continues to check for leakage current, and if a leakage current is detected, the high voltage power supply is switched by the controller to the OFF state and the engineer is warned of the fault condition. Once the high voltage supply is enabled, the low voltage supply may be set to zero volt output to conserve power. Any leakage current can still be detected by the sensor utilizing the high voltage supply as the source.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
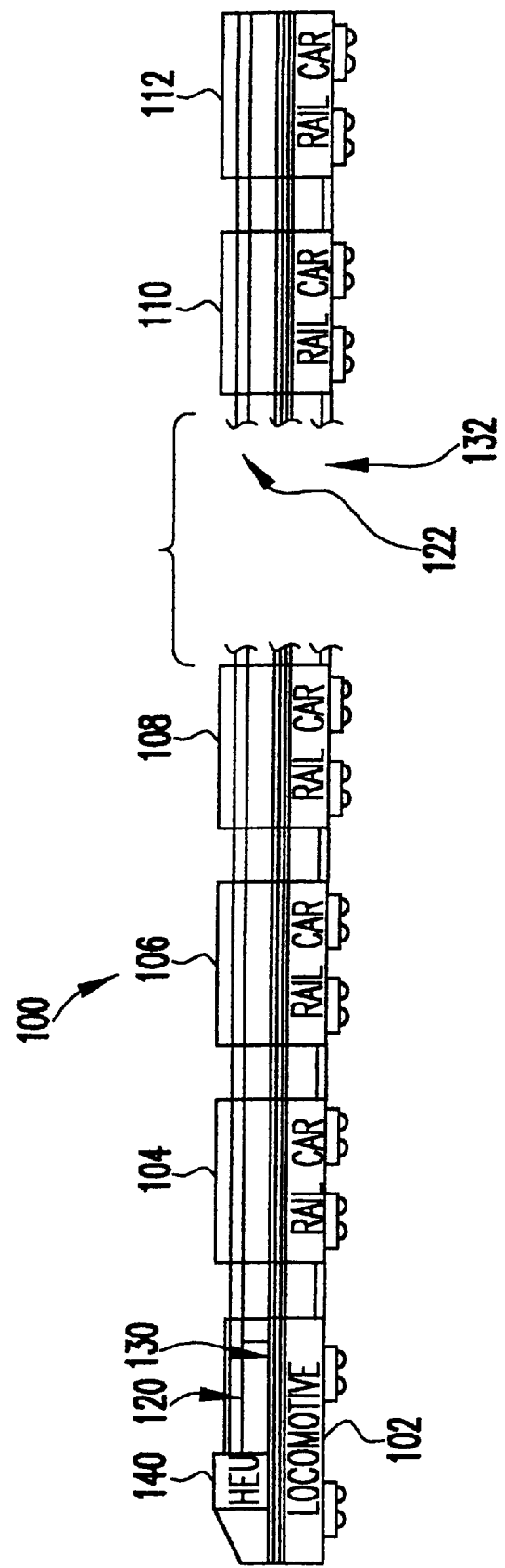
FIG. 1 is a simplified schematic diagram of a train, including a leading locomotive followed by numerous trailing railcars where the dark solid line represents an electrical power line extending the length of the train and the two parallel lines extending the length of the train are used to represent a brake air line extending the length of the train.

Referring now to the drawings, wherein like reference numerals indicated the same or similar components, and more particularly to FIG. 1, there is shown an ECP equipped train, of the prior art generally designated 100, including a locomotive 102, railcar 104, railcar 106, railcar 108, railcar 110 and railcar 112. Extending the length of the train 100 is brake air pipe 120, which is shown by two closely spaced and separated parallel lines extending the length of the train and having a discontinuous section 122 disposed between railcar 108 and railcar 110 to signify the position for insertion of numerous other railcars. Extending the length of the train 100 is electronic power line 130, which is shown by a solid black line having a discontinuous section 132 disposed between railcar 108 and 110 to signify the position for inclusion of numerous other railcars disposed there between.

The train of FIG. 1 is intended to graphically display some of the key components of an ECP equipped train, which is known in the art. A Head End Unit (HEU) 140, disposed in the locomotive, may be coupled to both line 130 and pipe 120. HEUs are well known in the art.

Figure 2:
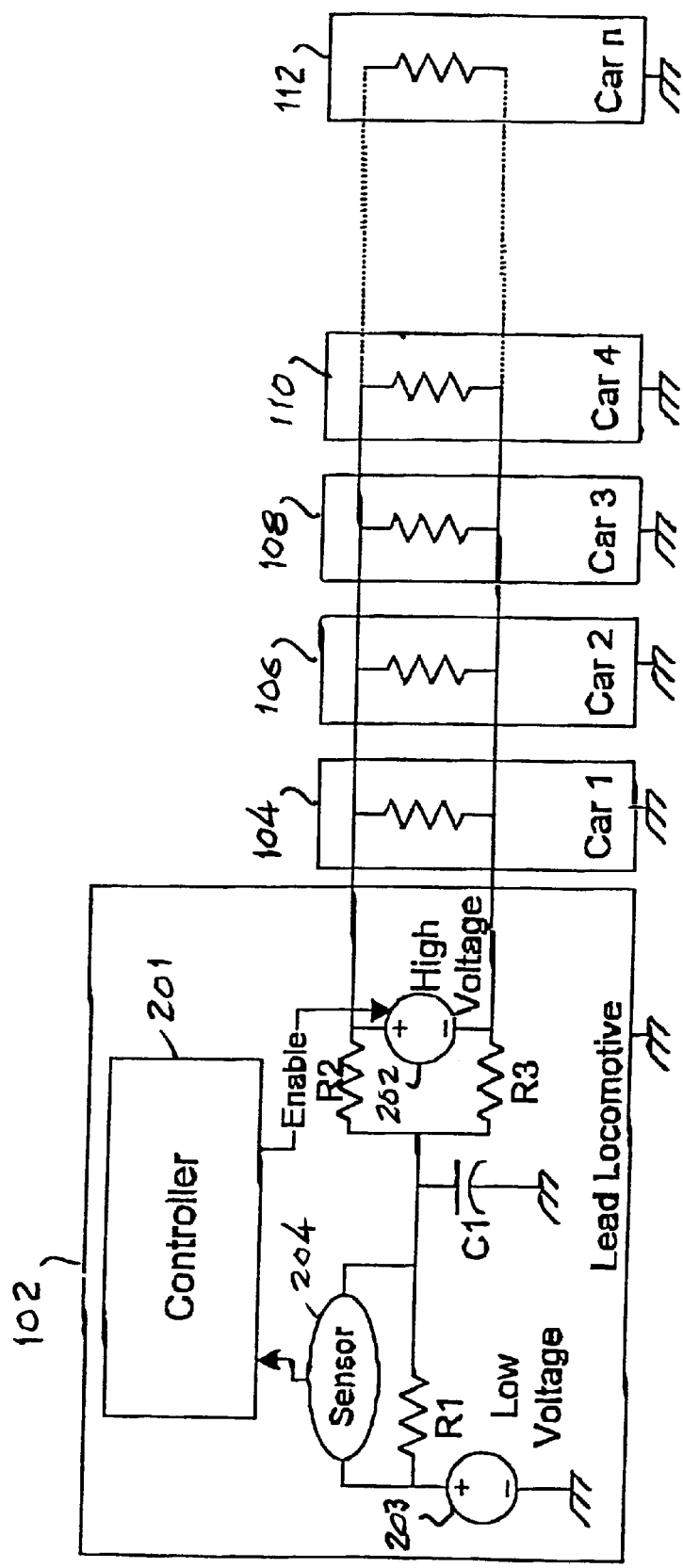
FIG. 2 is a schematic diagram of the circuit according to the invention.

In FIG. 2, there is shown the apparatus for detecting leakage current according to the invention. In FIG. 2, the locomotive 102 and the railcars 104 to 112 are represented schematically. In the locomotive 102, there is a controller 201 which may be part of the HEU. The controller 201 controls a source of high voltage 202 via an enable signal. The source of high voltage is connected across the power line 130 which extends the length of the train. The resistors shown in each car across the train line represent the normal electrical load of the electronic equipment of the car.

A low voltage power supply 203 is used to apply a common-mode voltage to both conductors of the train line 130 via resistors R1, R2 and R3. The values of the resistors R2 and R3 must be equal. When there is no leakage current from either train line conductor to earth ground, there will be no current flowing through resistor R1. If there is a current path from either train line conductor to earth ground, current will flow through R1 and be detected by the sensor 204 as a fault condition. Since R2 and R3 are the same value, the detection of leakage current works both with and without the high voltage supply energized. The leakage current detection is also independent of the polarity of the high voltage supply. Note that the sensor 204 must be capable of detecting either positive or negative current flowing through resistor R1. Also note that the low voltage supply may be set to zero volt when the high voltage supply is enabled.

The capacitor C1 is used to attenuate any high frequency signals that may be on the train line conductors due to the digital communication signals. These communication signals are connected across the two train line conductors and will normally cancel to zero voltage at C1; however, due to the length of the train line 130, it is possible for phase differences in the signal to appear at C1. Resistors R2 and R3 and capacitor C1 form a low pass filter to minimize the effects of these signals.

The actual values of the components will be set based on the desired level of leakage current detection, the value of the high voltage supply, and the amount of power that can be dissipated to perform this function. In one implementation, R1=R2=R3=25,000 Ohms (25 k$\Omega$), C1=1, 200 pico Farads (pF), the high voltage power supply voltage is 230 VDC, and the low voltage power supply voltage is 15 VDC. The value of the low voltage supply, R1, R2 and R3 should be selected to provide a voltage and current that is not hazardous to personnel coming into contact with it.

Figure 3:
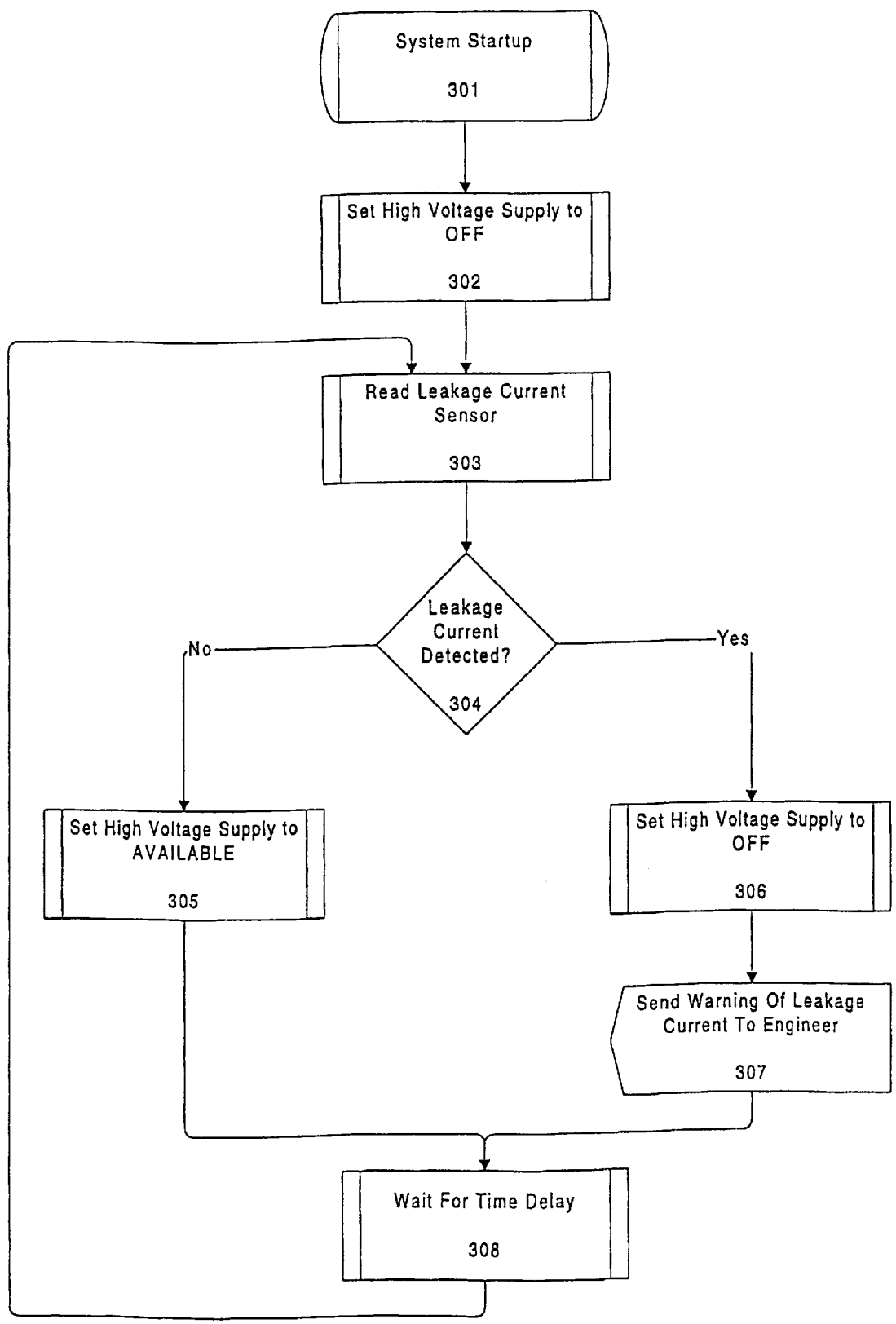
FIG. 3 is a flow diagram showing the process performed according to the method of the invention.

The method by which the apparatus is used to protect personnel is shown in FIG. 3. The ON/OFF state of the high voltage power supply 202 is controlled by a controller 201 in the lead locomotive, as shown in FIG. 2. This controller 201 also has access to the output of the sensor 204. During system start-up, the controller 201 sets the high voltage power supply to the OFF.

The process shown in FIG. 3 begins at system startup in block 301. As mentioned, as part of the system startup, the high voltage supply is set to OFF in function block 302. At this point a processing loop is entered which begins by reading the leakage current detector in function block 303. This is done by the controller 201 reading the output of the sensor 204 to determine if there is any leakage current sensed. In decision block 304, a determination is made as to whether any leakage current is sensed. If no leakage current is sensed, the high voltage supply 202 is made available to be set to the ON state in function block 305 (by operator control or other system logic). However, if leakage current is sensed, the high voltage supply is set to OFF in function block 306, and the operator is given a warning that leakage current is detected in function block 307. After a predetermined time delay as set in function block 308, the process loops back to function block 303 to again read the leakage current sensor.

Once the high voltage supply 202 has been set to the ON state in function block 305, the controller 201 continues to periodically monitor the output of the sensor 204 in function block 303. If leakage current is detected, the controller 201 sets the high voltage supply state to OFF in function block 306 and warns the operator of the fault condition. Once the high voltage supply 202 is set to the OFF state, disabling the high voltage supply, the low voltage supply 203 is still available to allow sensing of leakage current.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus which detects leakage current on a two wire power line comprising:

two resistors of equal value respectively connected in series to the two wires of the power line;

a sensing resistor connected in series with a junction of first two resistors;

a low voltage power source connected between the sensing resistor and earth ground;

a sensor connected across the sensing resistor to detect a leakage current; and a controller connected to receive an output of the sensor, the controller being operable to control a high voltage power source connected across the two wires of the power line to be either in an OFF state or enabled to be in an ON state, depending on whether a leakage current is sensed by the sensor.

2. The apparatus of claim 1, wherein the sensor is capable of detecting either positive or negative leakage currents.

3. The apparatus of claim 2, which apparatus is used in ECP equipped trains in which digital signals are transmitted on the two wire power line, further comprising a capacitor is connected between the junction of the first two resistors and earth ground, forming a low pass filter to minimize the effects of the digital signals.

4. The apparatus of claim 3, wherein the controller is incorporated in a Head End Unit (HEU) of lead locomotive.

5. The apparatus of claim 1, wherein the controller is operable to switch the low voltage power source to zero volt when the high voltage power source is in an ON state.

6. The apparatus of clam 1, further comprising means for switching the high voltage power source to an ON state when the controller enables the two wires of the power line to be in the ON state.

7. A method for detecting a leakage current on a two wire power line comprising the steps of:

connecting two resistors of equal value respectively in series to the two wires of the power line and a sensing resistor in series with a junction of the first two resistors;

connecting a low voltage power source between the sensing resistor and earth ground and a sensor across the sensing resistor to detect a leakage current;

initially setting a high voltage power source connected across the two wire power line to the OFF condition; and checking the sensor to determine if a leakage current is detected, and if so, the high voltage power source is maintained in the OFF state, but if no leakage current is detected, enabling the high voltage power supply to be set to the ON state.

8. The method of claim 7, further comprising the step of continuing to check the sensor for leakage current while the high voltage power supply is in the ON state, and if a leakage current is detected, switching the high voltage power supply to the OFF state.

9. The method of claim 7, further comprising the step of switching the low voltage power source to zero volt when the high voltage power source is in the ON state.

10. The method of claim 7, wherein the sensor is capable of detecting either positive or negative, leakage currents.

11. The method of claim 7, which method is practiced in ECP equipped trains in which digital signals are transmitted on the two wire power line, further comprising the step of connecting a capacitor between the junction of the first two resistors and earth ground, forming a low pass filter to minimize the effects of the digital signals.

12. The method of claim 11, wherein the high voltage power source is incorporated in a Head End Unit (HEU) of lead locomotive.

13. An apparatus for detecting leakage current on a two wire power line of an ECP equipped train in which digital signals are transmitted on the two wire power line comprising:

means connecting a sensing resistor to the two wire power line;

a low voltage power source connected between the sensing resistor and earth ground;

a sensor connected across the sensing resistor to detect a leakage current;

a low pass filter connected across the sensing resistor and the low voltage power source to earth ground to minimize effects of digital signals on the sensor; and a controller connected to receive the output of the sensor, the controller being operable to control a high voltage power source connected across the two wires of the power line to be either in an OFF state or enabled to be in an ON state, depending on whether a leakage current is sensed by the sensor.

14. The apparatus for detecting leakage current recited in claim 13, wherein after the high voltage supply is enabled to be in an ON state, the controller continues to receive an output from the sensor and is operable to switch the high voltage supply to the OFF state when a leakage current is detected.

15. The apparatus for detecting leakage current recited in claim 13, wherein after the high voltage supply is switched to the ON state, the controller switches the low voltage supply to zero volt.

* * * * *